March 10, 1964 E. E. BEER 3,124,291

TWO-SPEED TAPE RECORDER TRANSPORT MECHANISM

Filed July 3, 1962 2 Sheets-Sheet 1

*INVENTOR.*
EMANUEL E. BEER

*BY* H. S. Mackey [signature]

ATTORNEY.

March 10, 1964 E. E. BEER 3,124,291

TWO-SPEED TAPE RECORDER TRANSPORT MECHANISM

Filed July 3, 1962 2 Sheets-Sheet 2

INVENTOR.
EMANUEL E. BEER

BY H. L. Mackey

ATTORNEY.

3,124,291

TWO-SPEED TAPE RECORDER TRANSPORT MECHANISM

Emanuel E. Beer, White Plains, N.Y., assignor to General Precision, Inc., a corporation of Delaware Filed July 3, 1962, Ser. No. 208,669
3 Claims. (Cl. 226—178)

This invention relates generally to tape recorders and more particularly to transport mechanisms capable of operating a single capstan at one of two speeds in response to signals recorded on the tape or received from an external source.

In closed-loop tape recording and playback devices only one driving element can be utilized for transporting the tape, therefore quite a problem is presented where it is necessary to move the tape at two different widely separated speeds. A number of solutions for this problem have been proposed. However, in each instance the transport mechanisms are limited in the ratio of the two speeds, since it is necessary to maintain the speed of the flywheel during playback and recording within very narrow limits. Thus, in those systems in which the high speed affects the flywheel speed, it is impossible to increase the high speed to such a point that the flywheel will not be restored within a reasonable time to the proper playback or record speed.

An example of a limited two-speed transport mechanism is shown in the patent to J. P. Arndt, Jr., et al., No. 2,521,623. In the structure disclosed in this patent two motors are connected to the flywheel and each drives the flywheel at its own speed. However, in those instances where the fast speed is ten or more times the record or playback speed, which is the lower of the two speeds, the flywheel will not be restored quickly enough to the normal record and playback speeds.

One object of this invention is to provide a two-speed tape transport mechanism utilizing a single tape driving member which has a constant flywheel speed under all conditions of tape movement.

Another object of this invention is to provide a two-speed tape transporting mechanism which may have speed ratios in excess of ten to one.

A further object of this invention is to provide a tape transport mechanism which is inexpensive to manufacture, reliable and troublefree in operation.

The foregoing and other objects and advantages of the invention will become more apparent from a consideration of the drawings and the specification wherein one embodiment of the invention is shown and described in detail for illustration purposes only.

Figure 1:
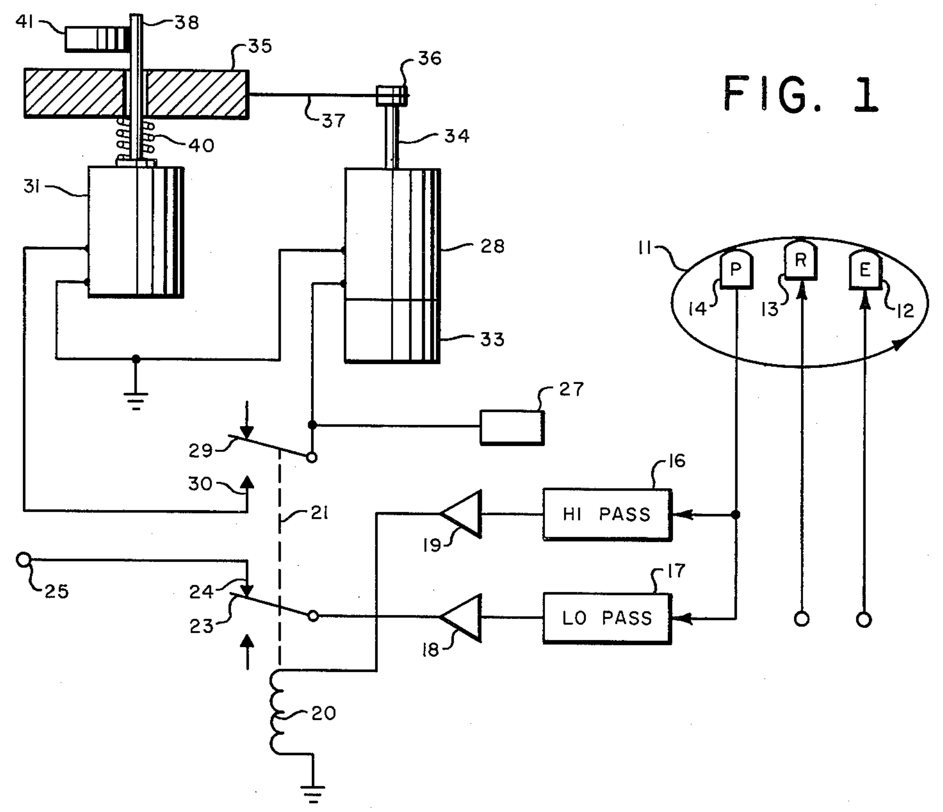
FIGURE 1 is a schematic diagram of a complete tape recording system employing a novel tape transport mechanism constructed in accordance with the invention.

In FIGURE 1 the closed tape loop 11 is shown in contact with the erase head 12, the record head 13, and the playback head 14. Both the erase head and the record head are connected for receiving external erase and external recording signals. The manner in which these signals are connected is not pertinent to the subject invention and, therefore, is neither shown nor described.

Playback head 14 is connected to a high-pass filter 16 and to a low-pass filter 17. The output of low-pass filter 17 is connected to an amplifier 18 and the output of high-pass filter 16 is connected to another amplifier 19. Amplifier 19 has its output connected to a relay winding 20 which operates a double-pole, double-throw switch 21. Amplifier 18 has its output connected to an armature 23 of switch 21 which is shown in its normally de-energized position.

In this position it engages a contact 24 of switch 21 which is connected to an audio output terminal 25. Terminal 25 may be connected to any device which is capable of utilizing the audio output signal from tape 11. A voltage source 27 is connected to the tape drive motor 28 and to the wiper 29 of switch 21, which is also shown in its normal or de-energized position. A contact 30 is connected to a second motor 31 which in this instance is the high speed motor, motor 28 being the playback or low-speed motor.

The tape 11 has two signals recorded on it. A high frequency signal and a low frequency signal. When the low frequency signal is passing over the playback head 14, the low-pass filter 17 provides an output which is amplified in amplifier 18 and goes through armature 23, contact 24, to the audio output 25. However, if the frequency should change to the higher band then the output of playback head 14 will pass through the high-pass filter 16 and amplifier 19. This will energize solenoid 20 which will move switch 21 and its associated armatures 23 and 29 to the alternate position from that shown in the drawing. When moved, armature 29 will engage contact 30 and provide voltage to both motors 28 and 31 whereas under the prior condition described only motor 28 is energized. Motors 31 and 28 are both connected to ground to complete their circuits.

A governor 33 regulates the speed of motor 28 and the output shaft 34 is connected to a flywheel pulley 35 by a drive pulley 36 mounted on the end of the shaft and a belt 37. Thus flywheel pulley 35 will rotate at a speed which corresponds to that of motor 28 at all times since motor 28 is energized at all times. Flywheel pulley 35 is mounted freely on a shaft 38 connected to the rotor of motor 31. A one-way spring clutch 40 transmits the torque from motor 28 to shaft 38 causing it to rotate at the same speed as flywheel pulley 35 so long as motor 31 is de-energized.

However, when motor 31 is energized the speed of the shaft 38 will be that of motor 31 since the flywheel speed is lower than the speed of motor 31 and no torque will be transmitted from shaft 38 to flywheel pulley 35 or from flywheel pulley 35 to shaft 38. Thus the speed of shaft 38 is determined solely by motor 31 when it is energized, and solely by motor 28 when motor 31 is de-energized. A pressure roller 41 engages shaft 38 to assure constant tape movement and engagement of the tape 11 with the shaft 38.

Figure 2:
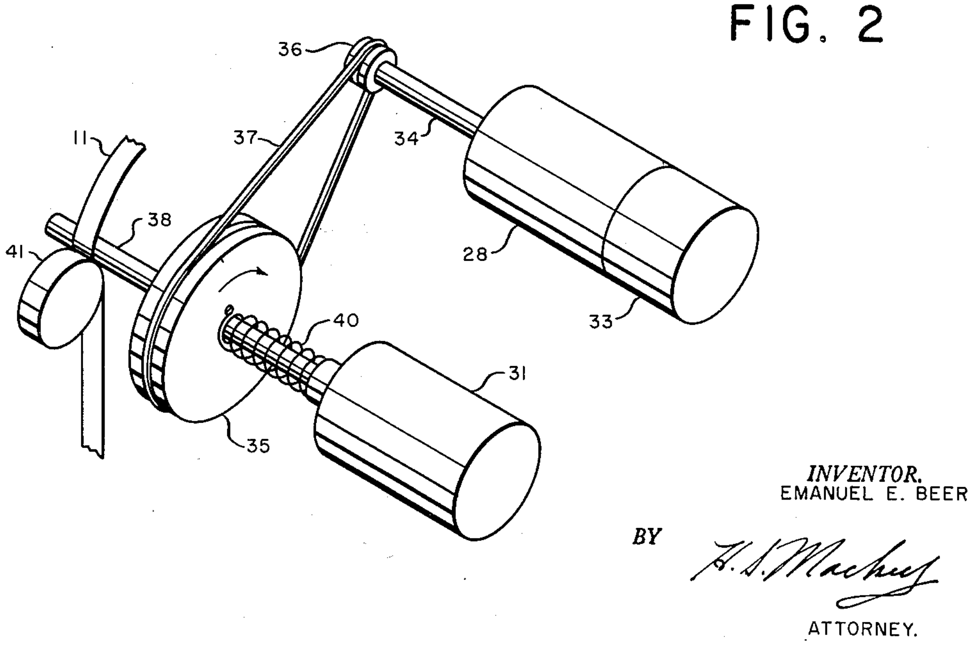
FIGURE 2 is an isometric view of the tape transport mechanism shown in FIGURE 1 with all of the supporting structure removed in order to clearly illustrate the mode of operation of the transport mechanism.

The isometric view shown in FIGURE 2 illustrates the connection of the elements previously described in FIGURE 1 and shows their interrelation. It should be noted at this time that flywheel 35 is not an integral part of shaft 38 or the capstan and that the one-way slip spring clutch 40 is wound opposite to the rotation of flywheel 35 so that no torque may be transmitted from shaft 38 to flywheel 35 or from flywheel 35 to shaft 38 unless shaft 38 has a lower speed of rotation than flywheel pulley 35. Therefore, since the only time when the shaft 38 has a slower speed of rotation than flywheel pulley 35 is when motor 31 is de-energized, torque can only be transmitted during this time.

Figure 3:
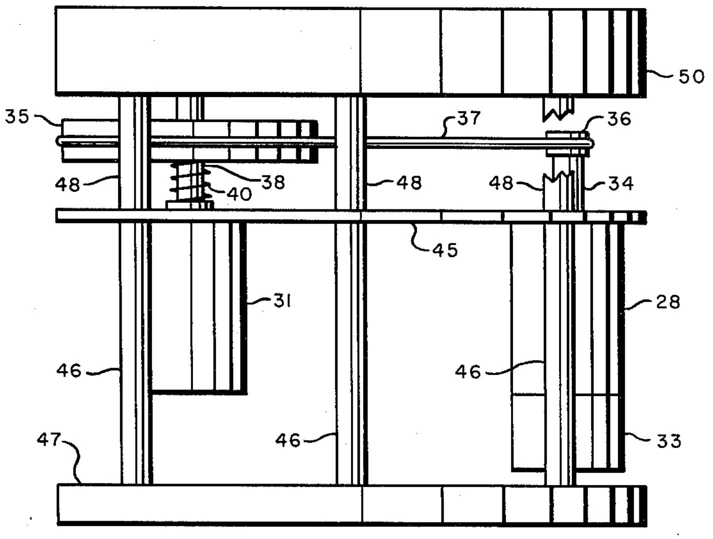
FIGURE 3 is a front elevation of the tape transport mechanism.
Figure 4:
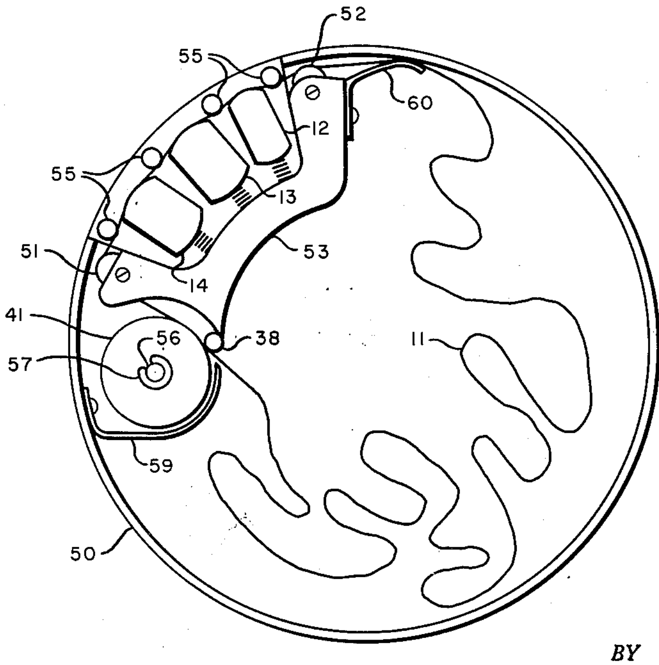
FIGURE 4 is a top plan view of the novel tape transport mechanism.

FIGURE 3 is a front elevation of the tape recorder and shows motors 28 and 31 attached to a mounting plate 45, which is supported by three rods 46, attached to a base plate 47. Three additional rods 48 support the tape magazine 50 which is better viewed in FIGURE 4 which is a plan view of the top of the recorder and shows the tape magazine 50 and the structure mounted therein.

A pair of tape guide pins 51 and 52 are attached to the bottom of tape magazine 50 and support a mounting bracket 53 from which the erase head 12, record head 13 and playback head 14 are supported. In addition to guide pins 51 and 52, four pressure fingers 55 maintain the tape 11 in contact with heads 12, 13 and 14. The tape 11 passes over guide pin 51 and between capstan 38 and pressure roller 41.

The pressure roller is mounted on a pin 56 which is attached to the bottom of magazine 50 and is held in place by a snap ring 57. A guide 59 attached to the wall of magazine 50 prevents the tape 11 from becoming entangled in the pressure roller 41 after it passes between the pressure roller and the capstan 38. A tape tensioning spring 60 is attached to support 53 and provides tension on the tape so that it can be uniformly drawn across the heads 12, 13 and 14.

The tape, after it passes between roller 41 and capstan 38 and before it passes between tensioning spring 60 and the annular wall of the magazine, is stacked loosely in the remaining area of the magazine and will pile up and remain in the vertical position in this area until it is drawn between tape tensioning spring 60 and the annular wall of the magazine 50.

While only one embodiment of the invention has been shown and described in detail for illustration purposes only, it is to be expressly understood that the invention is not to be limited to the specific details shown and described.

What is claimed is:

1. A multiple speed tape transport comprising,
a low speed motor,
a flywheel,
means for drivingly connecting said flywheel to said low speed motor,
a high speed motor,
a capstan driven directly by said high speed motor,
and a one-way clutch for drivingly connecting said flywheel to said capstan to rotate said capstan in the same direction as said high speed motor whereby said flywheel supplies driving torque to said capstan only when the rotational speed of said capstan due to the high speed motor is less than the rotational speed of the flywheel.

2. A multiple speed transport mechanism suitable for transporting magnetic recording tape comprising,
a low speed motor,
a flywheel,
means for mechanically coupling the flywheel to the low speed motor,
a capstan,
a high speed motor for driving said capstan,
a one-way clutch for coupling the flywheel to the capstan,
and means for selectively energizing and de-energizing said high speed motor whereby said capstan is rotated at a high speed when said high speed motor is energized and at the flywheel speed when it is de-energized.

3. A multiple speed tape transport mechanism comprising,
a low speed motor,
a high speed motor,
a capstan driven by said high speed motor in a predetermined direction,
a flywheel mounted concentrically with said capstan,
means for drivingly connecting said flywheel to the low speed motor to turn said flywheel in the same direction as the capstan is turned by the high speed motor,
and a unidirectional spring slip clutch connected to said flywheel and wound around said capstan in a direction opposite to that of the flywheel rotation in order to transmit torque from the flywheel to said capstan whenever the capstan speed in the predetermined direction is lower than the speed of the flywheel.

References Cited in the file of this patent

UNITED STATES PATENTS

| | | |
|---|---|---|
| 3,071,332 | Drain et al. | Jan. 1, 1963 |
| 3,079,056 | Groenewegen | Feb. 26, 1963 |